UNITED STATES PATENT OFFICE.

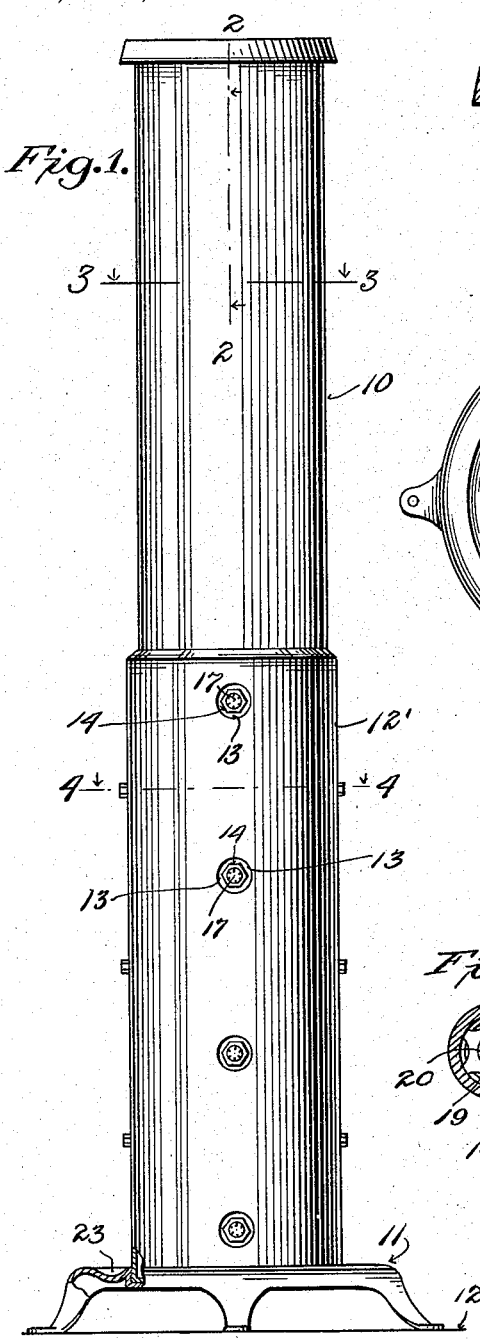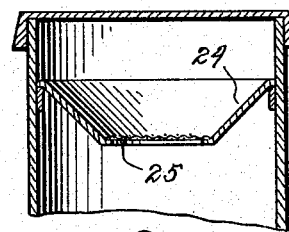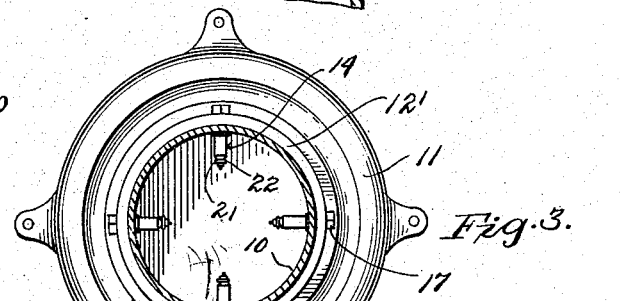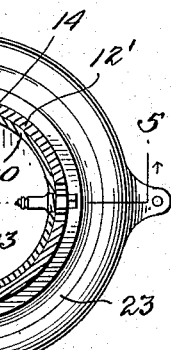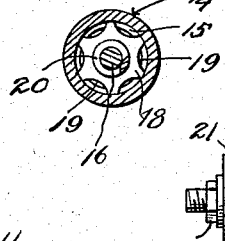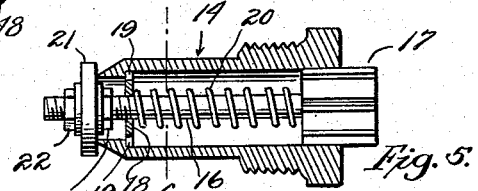

LAWRENCE E. FARRAR, OF FAIRMONT, NEBRASKA.

ANIMAL-OILER.

1,174,135.   Specification of Letters Patent.   Patented Mar. 7, 1916.

Application filed June 29, 1915. Serial No. 37,057.

*To all whom it may concern:*

Be it known that I, LAWRENCE E. FARRAR, a citizen of the United States, residing at Fairmont, in the county of Fillmore, State of Nebraska, have invented certain new and useful Improvements in Animal-Oilers; and I do hereby declare the following to be a full, clear, and exact description of the invention, such as will enable others skilled in the art to which it appertains to make and use the same.

This invention relates to improvements in oiling devices and particularly to devices for discharging oil or other disinfectant on to the bodies of hogs and other animals.

Another object is to provide a scratching post for animals to rub against which is adapted to contain oil or disinfectant and from which small quantities of said oil or disinfectant will be discharged on to the animal's body when it rubs against the scratching post.

Another object is to improve the construction of a valve for discharging the oil whereby loss of oil is prevented and also whereby any excess of oil discharged from the device and not taken up by the animal's body will remain within the valve casing to be discharged, when the valve-stem is again pushed in.

Other objects and advantages will be apparent from the following description when taken in connection with the accompanying drawing.

In the drawing: Figure 1 is an elevation of a scratching post made in accordance with my invention, Fig. 2 is an enlarged vertical section on the line 2—2 of Fig. 1, Fig. 3 is a horizontal section on the line 3—3 of Fig. 1, Fig. 4 is a horizontal section on the line 4—4 of Fig. 1, Fig. 5 is an enlarged transverse section on the line 5—5 of Fig. 4, and Fig. 6 is a section on the line 6—6 of Fig. 5.

Referring particularly to the accompanying drawing, 10 represents an upright hollow post formed preferably of metal and having a base 11 arranged to be secured to a floor or platform 12, said post being adapted to contain a fluid oil or disinfectant solution. Secured around the lower portion of the post is a felt or other suitable covering 12'. Formed through the post and through the felt are a plurality of openings 13, and screwed into these openings in the post are the hollow plugs 14. The bore of each of the plugs terminates at the inner end in a circumferential shoulder 15. Disposed longitudinally in the bore of the plug is a stem 16 on the outer end of which is secured a longitudinally grooved head 17. On the inner portion of the stem is carried a washer member 18 having a plurality of notches 19 in its periphery. This washer bears against the beforementioned shoulder 15 and is held thereagainst by a coil spring 20 encircling the stem between the washer and the head 17. The end of the stem inwardly of the inner end of the plug is threaded and carries a leather disk 21 securely clamped on the stem by the lock nuts 22, and normally bearing against the inner end of the plug. It will be noted that there are a plurality of these plugs and that the heads 17 extend a short distance outwardly of their ends so that when the hog or other animal rubs against the post one or more of the heads 17 will be pushed in so as to unseat the leather washer from the inner end of the plug and permit oil to flow through the plug, the grooves of the head, and on to the animal's body. The springs 20 restore the parts to normal position when pressure is relieved on the head. There will thus be left some oil in the plugs so that there will be insured a proper flow the instant that the head is pushed in.

To provide for catching any of the oil which would overflow from the plugs, I provide a circular groove 23 in the upper side of the base. The animals can also rub against this base and get oil on their bodies.

In the upper end of the post is a funnel shaped wall 24 at the lower end of which is a strainer screen 25 which prevents dust and dirt from getting down into the oil.

The provision of the leather washer as a valve provides a soft surface which will not be prevented from setting against the inner end of the plug by any dirt or grit which might get into the oil. It will be noted that the inner end of the plug is slightly sharpened so that there will be a very thin edge for engagement in the surface of the leather washer.

It will be noted that the cylinder 10 is screwed into the base 11. By this arrangement, the owner can have several cylinders while the base can be secured to a suitable platform where desired. This would save considerable time in changing the cylinders when the one on the base becomes empty.

What is claimed is:

A valve for an animal oiling rubbing post comprising a hollow plug having the inner end sharpened, and an interior shoulder adjacent the inner end thereof, a longitudinal stem in the plug, a longitudinal grooved head carried by the outer end of the stem and partly projecting from the outer end of the plug, a circumferentially notched plate carried by the stem and bearing against said shoulder, a spring on the stem between the head and plate, the inner end of the stem projecting inwardly of the inner end of the plug and having mounted thereon a leather disk for engagement with the sharpened inner end of the plug.

In testimony whereof, I affix my signature, in the presence of two witnesses.

LAWRENCE E. FARRAR.

Witnesses:
VENDA PUTLITZ,
J. M. BARTON.

Copies of this patent may be obtained for five cents each, by addressing the "Commissioner of Patents, Washington, D. C."